Figure 1:
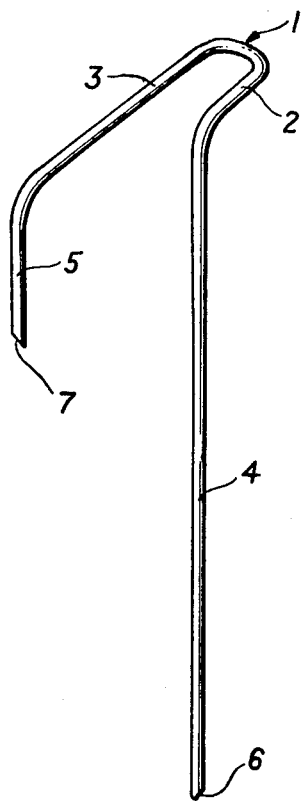

United States Patent
Bleile

[15] 3,706,115
[45] Dec. 19, 1972

[54] STAPLE FOR SOD AND EROSION CONTROL MATTINGS

[72] Inventor: Robert F. Bleile, R.D. No. 2, South Norwalk Road, Ohio 44857

[22] Filed: Feb. 9, 1971

[21] Appl. No.: 113,878

[52] U.S. Cl. ................................................24/87 C
[51] Int. Cl. .................................................A44b 9/00
[58] Field of Search .........24/84 A, 84 C, 85 C, 87 C, 24/86 C, 6, 150 B, 150 FP, 150 DP, 261 WL, 261 CF, 261 PT, 73 CM, 151, 152, 154, 103, 153, 261 G, 90 W, 7, 39; 16/4, 8

[56] References Cited

UNITED STATES PATENTS

| | | | |
|---|---|---|---|
| 1,418,801 | 6/1922 | James | 24/87 C |
| 1,902,153 | 3/1933 | Barnes | 24/87 C X |
| 2,314,481 | 3/1943 | Crooks | 24/87 C UX |
| 324,126 | 8/1885 | LeGay | 24/153 R UX |
| 540,704 | 6/1895 | Vandercook | 24/39 UX |
| 1,554,527 | 9/1925 | Saalfrank | 24/150 B |
| 1,708,005 | 4/1929 | Wilson | 24/150 B |
| 2,499,192 | 3/1970 | Holtz | 24/49 P |

*Primary Examiner*—Donald A. Griffin
*Attorney*—Christen & Sabol

[57] ABSTRACT

A staple for holding sod in place or for fastening erosion control mattings to the ground includes an asymmetric generally J-shaped head portion and two shank portions of different length which extend perpendicularly to the plane defined by the head portion; when the staple is introduced into the ground the head portion exerts a surface pressure on the sod and the shank portions provide a double anchorage of the staple therein.

5 Claims, 3 Drawing Figures

PATENTED DEC 19 1972    3,706,115

INVENTOR

BY

ATTORNEY

STAPLE FOR SOD AND EROSION CONTROL MATTINGS

The present invention relates to a staple for holding sod in place or for fastening erosion control mattings to the ground, generally in connection with agricultural purposes, but more particularly in connection with the application of sodding to slopes in the construction of highways or in the care and maintenance of lawns and gardens.

In slopes adjoining highways and gardens, and generally in all decorative lawns a uniform and compact grass surface is desired to provide a strong and consistent surface layer. When grass is sown on the desired area it takes time for the grass to grow. Moreover, this first grass is usually very irregularly distributed and of a weak condition, so that a uniform and compact grass layer is not obtained until after one or more seasons. In the meantime, however, great care must be taken of the growing grass surface, and very often the surface layer is partially, or completely washed out by heavy rain.

Areas subject to wind and water erosion which primarily affects the fertile top layer have also been treated by sowing vegetation which develops interlaced roots which help to control the erosion of the soil. However, the difficulty has also appeared that in the growing stage the plants are often not strong enough to withstand the action of wind and water.

To avoid these disadvantages the use of sodding with fully grown grass or other plants or herbs has become more and more widespread. Particularly in the construction of highways it has the advantage that the slopes can be covered very quickly with a grass layer which provides an effective protection of the slope, a pleasant appearance, and at the same time requires only a minimal amount of care.

Mattings of straw and earth with already developed, resistant plants therein are also used to cover eroded areas and refertilize them.

These soddings or mattings, however, have a common disadvantage which consists in the difficulty of securing them to the bare ground, particularly if it is a steep slope like a side slope along a highway, until the roots have acquired their natural connection with the subsoil.

It is already known to use a wire mesh covering the whole area of sod or matting surface, which is fixed by means of stakes driven through the mesh and into the ground. However, this wire mesh has the disadvantages of being very expensive and having an unpleasant appearance. Further, the wire mesh has to be cut to size at the place of application, which results in a time consuming operation, and often in a waste of material, and eventually it must be removed.

The object of the present invention consists therefore in providing a securing means for sod and erosion control mattings which combines the advantage of a wire mesh, that is exerting a pressure onto surface areas of the sod or matting, with a firm attachment to the ground, and which is at the same time of low cost and of universal application independently of the size of the area to be secured.

This object can be realized by means of a staple which comprises a generally J-shaped head portion formed with two limbs of different length, and two shank portions which extend each from one of the free ends of the two limbs in a generally perpendicular direction to the plane defined by the U-shaped head portion.

Figure 2:
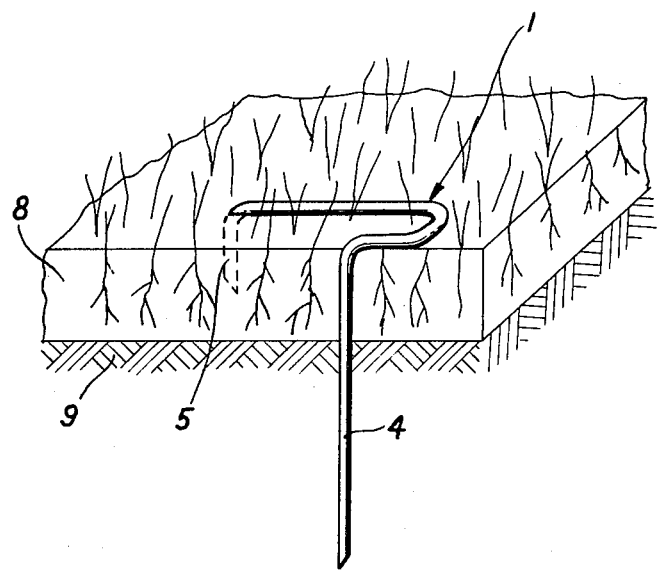
Figure 3:
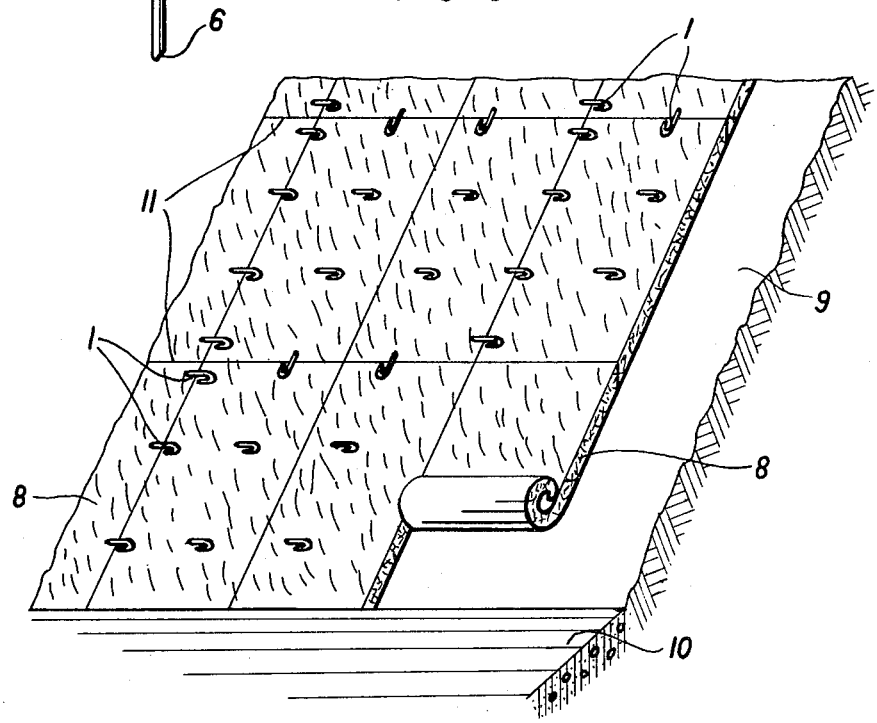

Other objects and advantages of the present invention will be apparent from the following detailed description, with reference to the accompanied drawings in which:

FIG. 1 shows a staple according to the invention;
FIG. 2 shows a staple in it operative position holding a section of sod in place; and
FIG. 3 shows a preferred arrangement of staples according to the invention.

Referring now to FIG. 1, a staple according to the invention is fashioned from a single piece of rod, preferably metal rod, of for instance No. 8 gage. But other materials like plastic, wood, etc., can also be used, provided they have the required rigidity and resistance. A generally J-shaped head portion 1 includes a shorter limb 2 and a longer limb 3. Preferably, the length ratio of these two limbs is approximately 1 : 2.

A first shank portion 4 extends from the free end of limb 2 in a generally perpendicular direction to the plane defined by head portion 1, and a second shank portion 5 extends from the free end of limb 3 in generally the same direction as said first shank portion 4. It makes no difference in which of the two possible generally perpendicular directions to the plane defined by head portion 1 the two shank portions extend, provided both extend in the same direction, and the scope of the invention is intended to cover both possibilities. Shank portion 4 is longer than shank portion 5, preferably in a ratio of approximately 1 : 8.

The free end 6 of shank portion 4 and the free end 7 of shank portion 5 are both beveled to facilitate the introduction of the staple through the sod or matting and into the ground, for instance defining each an angle of 45°.

FIG. 2 shows a staple according to the invention in its operative position holding a sod 8 against the ground 9. The staple is driven with its longer shank portion 4 straight through the sod and into the ground, until the head portion 1 rests on the surface of the sodding and exerts a pressure on it. At the same time the shorter shank portion 5 is also introduced into the sod and provides an anchorage point for the staple, so that no rotation of the staple is possible and its position remains unchanged in the sod. That means that not only the portion of the sod in direct contact with shank 4 is held by it, but that the entire area of sod 8 comprised between shanks 4 and 5 and subject to the pressure of head 1 is firmly secured to the ground 9. Moreover, due to the inherent friction of the material of the sod and to the roots of the fully developed grass or other herbs or plants, this effect is not limited to said portion of the sod but extends over a larger area around the staple.

Preferably the length of shank 5 is shorter than the length of shank 4, as mentioned above, in order to facilitate the introduction of the staple. Shank 5 is designed only to penetrate into the layer of sod or matting, which offers little resistance. The resistance of the ground 9, for instance in form of embedded stones, has therefore only to be overcome by shank 4, and that can easily be achieved by slightly altering the direction of introduction. Thus, it is apparent that the staple according to the invention provides the advantage of easy introduction of the staple into the ground, combined with the advantages offered by a second anchorage point of the staple in the sod and by the surface pressure exerted on the sod or matting.

An arrangement of the staples according to the invention to hold for instance a plurality of sections of sod or mattings at side slopes of a highway is shown in FIG. 3. Pieces of sod or mattings 8 are applied to the side slope 9 adjacent to the pavement 10 of a highway. Experiments regarding the distribution of the staples in order to obtain an optimal fixation of the sod or mattings to the ground have shown a checker board pattern to be the most suitable one, whereby in case of sod the staples are placed approximately two feet apart and in case of mattings approximately three feet from each other. It is preferable to place the staples with their head portions 1 perpendicular to the flow of water to increase the resistance of the portions of sod for matting against being washed out by the water flow.

However, if the staples are pegged in the seam 11 of two adjacent pieces of sod or mating, the head portions are preferably placed parallel to the flow of water, to allow one staple to hold together both pieces of sod or matting.

It has been found that the head portion 1 of the staple according to the invention is preferably formed in a size which corresponds to the normal size of the hand of a person, thus permitting a convenient manipulation when the staple is introduced into the ground by the operator.

It is to be understood that various changes may be made by those skilled in the art in the details of construction and arrangement of the present invention without departing from the spirit and scope of the invention which is defined in the appended claims.

I claim:

1. A staple for sod and erosion control mattings, comprising a single rod fashioned to define a generally J-shaped head portion including two limbs of different length, a first shank portion extending from the free end of the shorter one of said two limbs in a generally perpendicular direction to the plane defined by said J-shaped head portion, and a second shank portion extending from the free end of the longer one of said two limbs in generally the same direction as said first shank, said shank portions being of unequal lengths, the shorter of said two shank portions having a length substantially no greater than the thickness of sod and matting with which the staple is to be used.

2. A staple as defined in claim 1, wherein said first shank portion is longer than said second shank portion.

3. A staple as defined in claim 2, wherein the length ratio of said two limbs is approximately 1 : 2 and the length ratio of said two shanks is approximately 1 : 8.

4. A staple as defined in claim 1, wherein said head portion and said shank portions are fashioned from a single piece of rod.

5. A staple as defined in claim 1, wherein said two shank portions are each provided with a beveled end.

* * * * *